United States Patent
Alessandro et al.

(10) Patent No.: US 11,001,040 B2
(45) Date of Patent: May 11, 2021

(54) PIGMENTED PVC BASED GRAPHICS FILMS

(71) Applicant: Avery Dennison Corporation, Glendale, CA (US)

(72) Inventors: Mark Alessandro, Lakewood, OH (US); Emre Unsal, Painesville, OH (US)

(73) Assignee: Avery Dennison Corporation, Glendale, CA (US)

( * ) Notice: Subject to any disclaimer, the term of this patent is extended or adjusted under 35 U.S.C. 154(b) by 51 days.

(21) Appl. No.: 16/106,840

(22) Filed: Aug. 21, 2018

(65) Prior Publication Data
US 2019/0061326 A1    Feb. 28, 2019

Related U.S. Application Data

(60) Provisional application No. 62/549,323, filed on Aug. 23, 2017.

(51) Int. Cl.
| | |
|---|---|
| B32B 27/30 | (2006.01) |
| B32B 27/08 | (2006.01) |
| B32B 27/40 | (2006.01) |
| B32B 27/20 | (2006.01) |
| C09J 7/38 | (2018.01) |
| C09J 7/29 | (2018.01) |

(52) U.S. Cl.
CPC .............. *B32B 27/08* (2013.01); *B32B 27/20* (2013.01); *B32B 27/304* (2013.01); *B32B 27/40* (2013.01); *C09J 7/29* (2018.01); *C09J 7/385* (2018.01); *B32B 2250/24* (2013.01); *B32B 2307/4026* (2013.01); *B32B 2307/412* (2013.01); *B32B 2307/54* (2013.01); *B32B 2451/00* (2013.01); *C09J 2301/122* (2020.08); *C09J 2301/162* (2020.08); *C09J 2301/302* (2020.08); *C09J 2427/006* (2013.01); *C09J 2475/006* (2013.01); *Y10T 428/28* (2015.01); *Y10T 428/2848* (2015.01); *Y10T 428/2861* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 4,556,595 A * | 12/1985 | Ochi | C09J 7/10 |
| | | | 428/143 |
| 5,045,386 A | 9/1991 | Stan et al. | |
| 5,993,961 A * | 11/1999 | Ugolick | B32B 37/153 |
| | | | 428/354 |
| 6,630,049 B2 | 10/2003 | Hannington et al. | |
| 6,838,142 B2 * | 1/2005 | Yang | B32B 17/10018 |
| | | | 428/40.1 |
| 7,060,351 B2 | 6/2006 | Hannington | |
| 7,332,205 B2 | 2/2008 | Hannington et al. | |
| 7,344,618 B2 | 3/2008 | Hannington et al. | |
| 7,820,288 B2 | 10/2010 | Hannington | |
| 8,084,124 B2 | 12/2011 | Hannington | |
| 8,252,403 B2 | 8/2012 | Hannington | |
| 8,568,849 B2 | 10/2013 | Shi et al. | |
| 2004/0001948 A1 * | 1/2004 | Mussig | C08J 5/18 |
| | | | 428/343 |
| 2009/0208736 A1 | 8/2009 | Patterson et al. | |
| 2009/0252937 A1 * | 10/2009 | Zeik | B44C 1/105 |
| | | | 428/195.1 |
| 2013/0045371 A1 * | 2/2013 | O'Donnell | C09J 7/29 |
| | | | 428/215 |
| 2016/0009937 A1 | 1/2016 | Dannewitz | |

FOREIGN PATENT DOCUMENTS

| | | |
|---|---|---|
| WO | WO 9413496 | 6/1994 |
| WO | WO2008094150 | 8/2008 |
| WO | 2013/102836 | 7/2013 |
| WO | WO201310283 | 7/2013 |
| WO | WO2014186135 | 11/2014 |

OTHER PUBLICATIONS

Ying Zhang et al., "Film for Decoration and Preparation Method Thereof", machine translation of CN1102689483 A, Sep. 26, 2012. (Year: 2012).*

OTomo, Shinya et al., "Graphic Film for License Plate, and License Plate Comprising Graphic Film and Manufacturing Method Thereof", machine translation of JP 2016-215672 A, Dec. 22, 2016. (Year: 2016).*

International Search Report and Written Opinion dated Nov. 5, 2018 issued in corresponding IA No. PCT/US2018/047246 filed Aug. 21, 2018.

* cited by examiner

*Primary Examiner* — Anish P Desai

(57) ABSTRACT

Multilayer graphics products are described. The graphics products include a polyvinyl chloride film layer, an adhesive layer on one face of the film layer, and a polyurethane layer on another oppositely directed face of the film layer. Also described are methods of producing the multilayer graphics products.

12 Claims, 7 Drawing Sheets

PIGMENTED PVC BASED GRAPHICS FILMS

CROSS-REFERENCE TO RELATED APPLICATION

The present application claims the benefit of U.S. Provisional Patent Application No. 62/549,323 filed Aug. 23, 2017, which is incorporated herein by reference in its entirety.

FIELD

The present subject matter relates to pigmented PVC based graphics films, and particularly those including a flexible transparent protective polyurethane layer. The present subject matter also relates to graphics products using these films, and methods of producing the noted films and graphics products.

BACKGROUND

A wide array of graphics products is known in the art, for example protective laminates and vehicle wrapping films. Although satisfactory in many respects, when attempting to improve one or more beneficial properties of the graphics product, corresponding detrimental changes typically occur in other aspects of the product. Accordingly, a need exists for a new class of graphics products having a balanced array of beneficial properties.

For certain applications, characteristics such as conformability, removability, and/or to repositionability the graphic product are of importance. Although some graphic products may exhibit one or more of these characteristics, no currently available product exhibits improvements in all characteristics without suffering from reductions in durability, strength, or significant increases in cost. Accordingly, a need exists for a new class of graphics products that exhibit improved conformability, removability, and/or repositionability while maintaining acceptable levels of durability, strength, and acceptable cost.

In still other applications, it would be desirable for the graphics products to exhibit particular combinations of tensile strengths, elongation values, and/or modulus values. Thus, a need exists for such graphics products.

SUMMARY

The difficulties and drawbacks associated with previous approaches are addressed in the present subject matter as follows.

In one aspect, the present subject matter provides a graphics product comprising a film layer including polyvinyl chloride. The film defines a first face and a second face oppositely directed from the first face. The graphics product also comprises a layer of adhesive disposed on the first face of the film layer. The graphics product additionally comprises a layer of flexible transparent polyurethane disposed on and immediately adjacent to the second face of the film layer, wherein the graphics product is free of adhesive between the layer of flexible transparent polyurethane and the second face of the film layer.

In another aspect, the present subject matter provides a method of producing a graphics product including a film layer having polyvinyl chloride, a layer of adhesive disposed on a first face of the film layer, and a layer of polyurethane disposed on and immediately adjacent to a second face of the film layer. The method comprises providing a layer of polyurethane. The method also comprises providing a polyvinyl chloride containing composition in liquid form. The method additionally comprises depositing the polyvinyl chloride containing composition onto the layer of polyurethane to form a film layer thereon. The method also comprises solidifying the film layer. And, the method also comprises forming a layer of adhesive on the solidified film layer, to thereby produce the graphics product.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
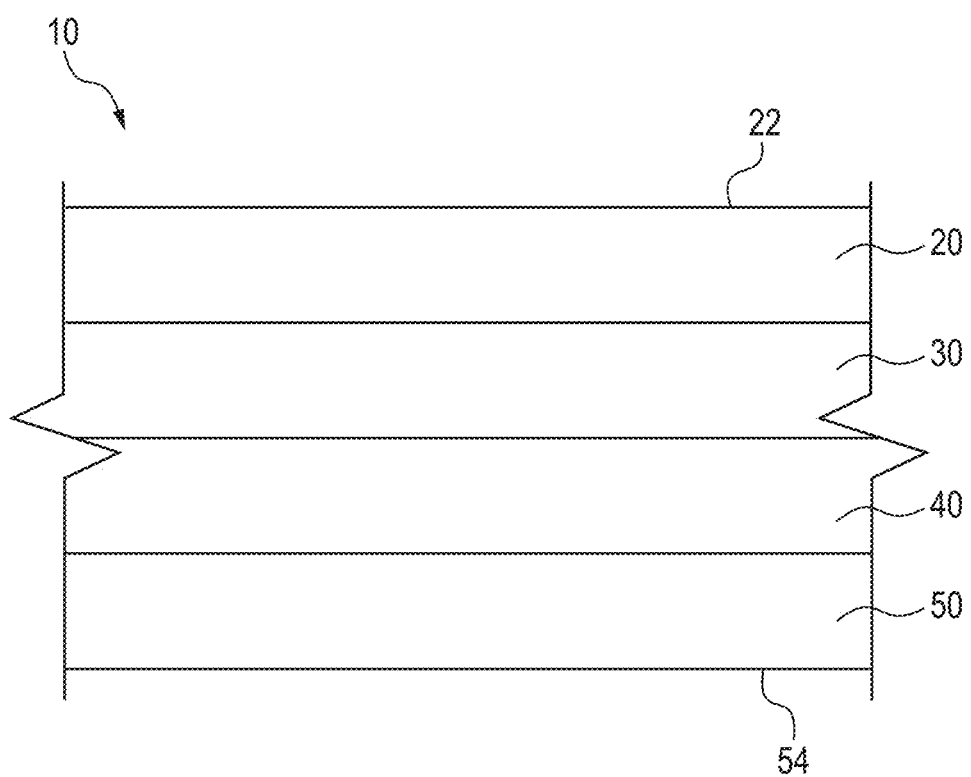
FIG. 1 is a schematic cross sectional view of an embodiment of a graphics product in accordance with the present subject matter.

The present subject matter relates to graphics products in the form of films and film laminates used for outdoor graphics applications, advertising, promotions and other marketing campaigns. The graphics products exhibit suitable outdoor durability, scratch resistance, gloss, tensile elongation and tensile strength. In many embodiments, the graphics products exhibit excellent conformability, removability, and/or repositionability. And in particular embodiments, the graphics products exhibit certain relatively high capacity to withstand or carry tensile loads, certain elongation values, certain modulus values, and in certain versions, two or more of these properties. Although many applications of the various graphics products are described as outdoor applications, it will be appreciated that the present subject matter is not limited to outdoor applications. Instead, the graphics products and related aspects of the present subject matter have wide applicability and include indoor applications for example.

The present subject matter generally relates to multilayer graphics products that comprise (i) a polyvinyl chloride (PVC) film layer, (ii) a layer of an adhesive such as a pressure sensitive adhesive (PSA) on one face of the PVC film, and (iii) a layer of a flexible transparent polyurethane (PU) immediately adjacent to the other face of the PVC film. The polyurethane layer is bonded directly to the PVC face. In many embodiments, the polyurethane layer is free of PVC. In many embodiments, there is no adhesive between the polyurethane and PVC layers. That is, the interface between the polyurethane layer and the PVC layer is free of adhesive.

Film Layer

The film layer generally comprises (i) pigment or pigment dispersion, (ii) copolymer or copolymer dispersion, and (iii) PVC or a PVC dispersion. The particular proportions of each component may vary. For many embodiments, the film layer comprises from about 10 wt % to about 35 wt % of pigment dispersion, from about 10 wt % to about 20 wt % of copolymer dispersion, and from about 50 wt % to about 75 wt % PVC dispersion. The pigment dispersion typically includes plasticizer(s) and may include solvent(s). The copolymer dispersion typically includes solvent(s). The PVC dispersion typically includes solvent(s), plasticizer(s), and stabilizer(s) for reducing or preventing detrimental effects caused by exposure to light and/or heat.

The component(s) used for the copolymer or copolymer dispersion can be selected from a wide array of polymers. Nonlimiting examples include polyethylenes and/or polypropylenes. The polymers can also include in addition, or instead of polyethylenes and/or polypropylenes, polyolefins other than polyethylenes and polypropylenes, alkene-unsaturated carboxylic acid or unsaturated carboxylic acid derivative copolymers, styrene-based polymers or copolymers, polyurethanes, polycarbonates, polyamides, fluoroplastics, poly(meth)acrylates, polyacrylonitriles, polyesters, or a mixture of any of the foregoing polymers. In certain versions, the film layer includes one or more ethylene vinyl acetate (EVA) copolymer(s).

Although most embodiments of the graphics products include one or more pigments or other colorant(s) or inks in the film layer, the present subject matter includes the use of film layers that are free of pigment or substantially free of pigment. The term "substantially free" of pigment as used herein refers to a concentration of pigment less than 1.0%, more particularly less than 0.1%, and in certain versions less than 0.01%. Such pigment-free film layers are typically transparent or substantially so.

The film layer may include one or more optional components. Nonlimiting examples of such optional components include light stabilizer(s), and/or heat stabilizer(s). Nonlimiting examples of light and/or stabilizers include UV absorbers, free radical scavengers such as hindered amine light stabilizers, and acid scavengers. Additional details of additives are described herein.

Adhesive Layer

A wide array of adhesives can be used in the graphics products. As noted, in many embodiments, the adhesive is a pressure sensitive adhesive. And, in many embodiments, the adhesive is a non-permanent acrylic adhesive.

The adhesive can be a pressure sensitive adhesive, glue, and/or any other type of adhesive that is suitable for use in graphics products. In many embodiments, the adhesives are optically transparent, and when used to contact printed indicia, do not affect the printed indicia. The adhesive may be pattern coated, and may be selected for particular properties such as permanent, removable or repositionable and the like. The adhesive can include random copolymer adhesives and/or block copolymer adhesives. Random copolymer adhesives include those based upon acrylic and/or methacrylic copolymers, α-olefin copolymers, silicone copolymers, chloroprene/acrylonitrile copolymers, and the like. Block copolymer adhesives may include those based upon linear block copolymers (i.e., A-B and A-B-A type), branched block copolymers, star block copolymers, grafted or radial block copolymers, and the like, and natural and synthetic rubber adhesives. A description of useful pressure sensitive adhesives can be found in Encyclopedia of Polymer Science and Engineering, Vol. 13. Wiley-Interscience Publishers (New York, 1988). Additional descriptions of useful pressure sensitive adhesives can be found in Encyclopedia of Polymer Science and Technology, Vol. 1, Interscience Publishers (New York, 1964).

The film layer and the adhesive layer are substantially coextensive with one another, that is the edges and/or sides are aligned and in juxtaposition. It is of course possible, that the adhesive layer could be applied in a pattern on the film layer so that the layers are not completely juxtaposed on one another.

When pressure sensitive adhesives are used, a release liner can be used to protect the adhesive from inadvertent contact with unintended surfaces. Any release liner suitable for the chosen adhesive can be used. For pressure sensitive adhesives, release liners can be coated papers or films, and super calendared paper, for example. Coating materials suitable for release liners include, for example, silicone-based and fluorine-based materials, or any other material that has the desired releasing properties, for example, waxes and carbamates.

Polyurethane Layer

A wide array of polyurethanes can be used so long as the resulting graphics product(s) exhibit the unique properties and benefits as described herein. In certain embodiments, the polyurethane is commercially available under the designation ARGOGUARD® from Argotec under the product number 46510. This polyurethane is an aliphatic polycaprolactone thermoplastic polyurethane.

In certain versions of the present subject matter, the polyurethane layer of the graphics products exhibits a relatively high degree of transparency. That is, the film(s) may be optically transparent or at least substantially so. The term "transparent" as used herein refers to such layers that exhibit a transparency of at least 60%, in other embodiments at least 70%, in still other embodiments at least 80%, in yet other embodiments at least 90%, in still further embodiments at least 95%, in other embodiments at least 98%, and in particular embodiments at least 99% as measured by ASTM D1746.

Suitable polyurethane polymer dispersions for use in the compositions of the present subject matter, are those with aliphatic polyurethane components. As the film products produced can be used in an outdoor environment, the films may be exposed to moisture, such as dew, rain or snow; temperature deviations; light and other conditions which may impact the film performance. For example, moisture may cause components of the film or images thereon to bleach out or fade, and the film itself to whiten. Therefore, the polyurethane polymer structure is designed in order for this film to resist degradation when exposed to such conditions. The polyurethane polymer structures are selected so as to achieve the required tensile properties, block resistance, scratch resistance, transparency, and gloss.

In another embodiment, the polyurethane film dispersions further include a polymer, a copolymer, prepolymers, or polymer blends selected from acrylic, styrene acrylic, vinyl acetate, olefin, and combinations thereof. Suitable polymers included in the polyurethane dispersions comprise, without limitation, acrylic polymers, styrene acrylic polymers, vinyl acetate ethylene copolymers, and polyolefins. Examples of suitable emulsion polymers include, without limitation, JONCRYL® 617A, JONCRYL® 1987, JONCRYL® 98, JONCRYL® FLX5000, ACRONAL® NX4612X and ACRONAL® OPTIVE 410 available from BASF, Ludwigshafen, Germany; and VINNAPAS® EF 811 from Wacker Chemicals, Munich, Germany or combinations thereof.

As described herein, in many embodiments, the polyurethane layer is free of PVC or at least substantially free of PVC. The term "substantially free" of PVC as used herein refers to relatively low concentrations of PVC in the polyurethane composition such as for example, less than 5%, in other embodiments less than 2%, in other embodiments less than 1%, in other embodiments less than 0.5%, and in still other embodiments less than 0.1%. As noted in certain embodiments, the polyurethane layer is free of PVC, i.e., the film(s) contain 0% PVC.

Optional Barrier Layer

The graphics products may additionally include one or more barrier layer(s). Typically a barrier layer, if used, is disposed between the adhesive layer and the PVC film layer. The barrier layer may include a wide array of agents and typically includes a majority proportion of polymeric components. The barrier layer may include one or more tie components, one or more pigments or colorants, and/or various additives. Additional details of barrier layer(s) are provided herein.

Additives

In addition, one or more of the noted film layer, adhesive layer, polyurethane layer, and/or optional barrier layer(s) may have at least one additive added thereto. The additives are selected from a group including UV stabilizing agents, free-radical scavengers, cross-linking agents, thickeners, flow and leveling agents, rheology modifiers, surfactants, defoamers, dispersants, wetting agents, dyes, pigments, slip agents, co-solvents, water, isopropyl alcohol, or combinations thereof. In one embodiment, the total amount of additives included in the composition of a particular layer of the graphics product is from about 1 wt % to about 30 wt %. In another aspect, the total amount of additives is from about 3 wt % to about 8 wt % of the particular layer.

As previously noted, UV blocking agents and free radical scavengers can be added to one or more of the various layers to improve the outdoor durability. UV blocking agents suitable for this application are typically benzotriazole based compounds, or other compounds capable of absorbing UV energy in the required region. Commercially available UV absorbing agents include, without limitation, TINUVIN® 99, TINUVIN® 400, TINUVIN® 1130 from BASF, Ludwigshafen, Germany; and HOSTAVIN® 3310 from Clariant, Muttenz, Switzerland. The amount of UV blocking agents can range from about 0 wt % to about 5 wt %.

Free radical scavengers may also be added to the polyurethane layer of the graphics products to improve the weather durability of the resulting graphics products. Suitable free radical scavengers include but are not limited to TINUVIN® 292, TINUVIN® 123 DW from BASF, Ludwigshafen, Germany; and HOSTAVIN® 3065 from Clariant, Muttenz, Switzerland. The amount of free radical scavengers can range from about 0 wt % to about 5 wt %.

Other acid scavengers can also be used for improving weathering durability of the graphics products. These include nano-sized zinc oxide, and cerium oxide or combinations thereof which may be used to achieve a desired UV resistance. Suitable nano-metal oxides include but are not limited to NANOBYK™ 3840, NANOBYK™ 3810 from BYK Additives, of Altana, Wesel, Germany. In certain embodiments, it may be preferred to use acid scavengers that utilize hydrotalcite chemistry as supplied by Kisuma Chemicals under the designation ALCAMIZER®. The total amount of such system additives may range from about 0 wt % to about 10 wt %. UV stabilizers and free radical scavengers can also be added to one or more other layer(s), for example an adhesive layer.

A wide array of heat stabilizers may be used. Nonlimiting examples of heat stabilizers include dithiocarbamates compositions. Heat stabilizers may include Ferro™ 1237, Ferro™ 1720, and Synpron™ 1163, all available from Ferro Corporation Polymer Additives Division, and Mark V™ 1923, available from Witco Corp.

Other additives can be used, such as for example, silicon dioxide and/or metal oxide particles to enhance the scratch resistance of the polyurethane film and/or the graphics products. The other additives together range from about 0 wt % to about 5 wt % of the total layer formulation. Suitable silicon dioxide particles include Minex 12® microparticles from Unimin Corporation and Nanobyk™ 3620 nanoparticles from BYK. Suitable metal oxides include Nanobyk™ 3600 aluminum oxide nanoparticles from BYK.

Additional components, such as thickeners, flow and leveling agents, slip agents, and rheology modifiers can be added to the layer formulations to achieve desired coating quality. Examples of suitable thickeners include, without limitation, ACRYSOL® RM-2020 NPR, TM8W, and UCAR® POLYPHOBE® 115 TR from Dow Chemicals, Midland, Mich. Examples of suitable flow and leveling agents include without limitation, Capstone™ FS-30, Capstone™ FS-35 from Dupont; Polyfox™ PF-156A from Omnova Solutions; Surfynol® 104 from Air Products, and Masurf® from Mason Chemical Company and others with similar chemistry. The percent incorporation for flow and leveling agents can vary from 0 wt % to 10 wt % in the film layer. Additional viscosity modifiers can be included in the formulations to modify the viscosity to a desired level and/or to impart desirable flow characteristics. Products like Rheolate® 150, Rheolate® 212, Rheolate® 288, and Rheolate® 350 from Elementis are typical examples that can be used in the formulations. The percent incorporation of viscosity modifiers can vary from between 0 wt % to 10 wt % in the film layer. Slip agents include, without limitation, Dow Corning® 52, Dow Corning® 54, and BYK® 301 and can be added to the film formulation at about 0 wt % to about 10 wt %. Other components, such as water or isopropyl alcohol (IPA) can also be added to the formulation at about 0 wt % to about 10 wt %.

Cross-linking agents can be added to the formulations to improve/modify the mechanical and chemical resistance properties of the particular layer(s). In one embodiment, the cross-linking agent is included to the formulation at about 0 wt % to about 10 wt %. In another embodiment, the cross-linking agent is included to the formulation at about 1 wt % to about 3 wt %. In one embodiment, crosslinking occurs during the drying of the film composition. Examples of suitable cross-linking agents include, without limitation, polyaziridine based CX-100 from DSM Neo Resins, Waalwijk, The Netherlands; UCARLINK™ XL-25SE, ERL-4221, ERL-4234 from Dow Chemicals, Midland, Mich.; and COATOSIL™ 1770, SILQUEST™ A-187 from Momentive Performance Materials Inc., Waterford, N.Y.

Without limitation, other additives, for example, surfactants, defoamers, dispersants, wetting agents, dyes, pigments and co-solvents known to those skilled in the art can be added to the composition of one or more layer(s).

Graphic Products

FIG. 1 is a schematic cross sectional view of an embodiment of a graphics product 10 in accordance with the present subject matter. The product 10 comprises an adhesive layer 20, an optional barrier layer 30, a PVC film layer 40, and a polyurethane layer 50. The outermost face of the adhesive layer is shown as face 22. And, an oppositely directed face of the polyurethane layer is shown as face 54. As previously noted, an optional protective liner or carrier (not shown) may be disposed on the adhesive face 22.

In many embodiments, each of the film layer, the adhesive layer, and the polyurethane layer has a thickness within a range of from about 0.5 mil (125 microns) to about 3 mil (75 microns), with a thickness of 1.5 mil (38 microns) for each layer being suitable for many applications. If a barrier layer is included, such barrier layer exhibits a similar thickness, i.e., from about 0.5 mil to about 1.5 mil.

Film thickness can be measured using a TMI Model 49-70 Precision Micrometer available from Testing Machines Inc. in Ronkonkoma, N.Y. The specimen is placed between an upper and a lower anvil. The upper anvil rests on top of the specimen and the thickness is measured and displayed on the digital readout.

The resulting graphics products exhibit a unique combination of physical properties. In certain embodiments, the graphics products exhibit a peak tensile load of at least 11.0 lbf/in without failing, e.g., fracturing, splitting, or breaking. Measurement of peak tensile load is described herein. In certain embodiments, the graphics products exhibit an elongation greater than 170% prior to failing. Measurement of elongation is described herein. In certain embodiments, the graphics products exhibit a modulus within a range of from 52,000 psi to 63,000 psi. Measurement of modulus is described herein. In particular embodiments, the graphics products exhibit two or more of these properties. And in certain specific embodiments, the graphics products exhibit all of these properties.

As previously noted, in certain embodiments, a barrier layer is disposed between the film layer and the layer of adhesive. The barrier layer serves to prevent or at least reduce the potential for migration of component(s) from the film layer into the adhesive layer. In particular embodiments, the barrier layer is white or gray in color depending on the color of the film layer to increase opacity of the resulting graphic product.

In addition to the foregoing, the graphics products can be further overcoated with a varnish or other material to provide a glossy appearance. This operation may occur during the film forming process, after printing, or after collection or rolling up of the material after the production process has been completed.

The graphics products of the present subject matter if sufficiently transparent, can be used in operative association with a graphic or other message. As used herein, operative association includes applying the graphics product over the graphic or message, including wherein the graphic or message is part of a substrate, over which the product is applied. As used herein, operative association also includes the graphic or message being an additional layer, such as a printing layer or previously printed layer on the film. As used herein, operative association also includes applying a graphic or message over the product. However, in many versions of the graphics products of the present subject matter, the products include effective amounts of pigments and/or colorants such that the graphics products are opaque and thus not transparent.

The graphics products can be used as part of a printable media for outdoor applications, architectural and transportation type advertising campaigns and the like. The film can also be used as a protective film to be laminated over a subject, such as a protective laminate for electronic appliances, architectural, artistic or aesthetic elements, a retro-reflective license plate, a retro-reflective signage film, a name plate, a label, automotive exterior and interior parts, and the like. Additional exemplary uses may include safety signs, a graphic display, governmental mandated displays, military applications, or a surface that needs protection in an outdoor environment. The graphics products also find wide application in vehicle wraps or wrapping or decal films.

Air Egress Channels

In certain embodiments, the present subject matter also provides graphics products having air egress channels defined or formed in the adhesive layer. Providing such air egress channels can significantly improve ease of installation or application of the graphics product to a surface of interest. And, providing such air egress channels can result in adhered graphics products free of air bubbles otherwise entrapped along the interface between the adhesive and the surface of interest.

Typically, a pattern is defined in the adhesive layer that provides for air egress. The pattern can be a plurality of dots, lines, or any geometric figure, that provides a path for air egress from the graphics products. When lines are used, at least about 50% of the pattern should extend to the edge of the graphics product to obtain acceptable air egress. The lines and dots may vary in size provided that air egress is maintained. The lines and other patterns generally have an average thickness from about 0.3 microns to about 100 microns, or from about 0.5 microns to about 50 microns, or from about 2 microns to about 20 microns. The width of the lines may also vary widely. An example of a useful range for line width is from about 12μ to about 250μ, or from about 25μ to about 125μ about 50μ to about 75μ. The pattern may be a grid of intersecting lines, a weave pattern, a waffle pattern, diagonal straight and curves lines, tiled geometric figures, such as hexagons, rectangles, overlapping circles or triangles, or lines in a cross hatch pattern. Combinations of patterns may be used such as a grid of intersecting lines with random or patterned dots.

The air egress patterns can be formed or otherwise provided on the adhesive layer by a variety of techniques such as by printing or depositing non-adhesive material on the exposed face of the adhesive layer, or by pressing, imprinting, or molding the pattern in the adhesive face by a belt, stamp, or roller; or by use of a release liner having the desired pattern on a face of the liner which contacts the adhesive face.

Assignee and owner of the present technology also obtained a number of patents directed to air egress channels in adhesive articles including but not limited to U.S. Pat. Nos. 8,084,124; 8,252,403; 7,820,288; 7,332,205; 7,344,618; 6,630,049; and 7,060,351.

Repositionability

In certain embodiments, the present subject matter also provides graphics products which can be repositioned after contacting to a surface of interest such as by removal and then re-adhering to the surface of interest. In certain versions, repositionability is exhibited by the graphics products being slidable along a surface of interest for at least an initial time period after application.

Repositionability can be accomplished in several ways. One preferred strategy is to incorporate an effective amount of microparticles in the adhesive layer. The incorporation of the microparticles may reduce the initial tack of the adhesive and in certain versions reduce the effective area of the resulting adhesive face.

As described more fully herein, the graphics products may be formed by applying the microparticles to a carrier web such as a release liner to provide repositionable forms that are randomly distributed or arranged in a non-regular manner on a surface of the carrier web, e.g., on the release surface of a release liner as discrete quantities of microparticles. In one embodiment, while being distributed on the carrier web (e.g., release liner) in a non-regular or random arrangement, the repositionable forms may be similar or regular in terms of their physical parameters. In another embodiment, the repositionable forms may be random in one or more physical parameters including size, shape, thickness, height, width, circumference, density, volume of material, and the like. In one embodiment, the repositionable forms may be in the shape of droplets or microspheres and may, when residing on a surface of a carrier web, such as the release surface of the release liner, have the appearance of hemispheres or mountains.

The dimensions of the repositionable forms may be controlled to some extent by the method by which they are applied in the carrier web. As used herein, the height of a repositionable form is the distance from a base of the form to the peak or apex of the form. In one embodiment, the repositionable forms, when applied to the release liner, may individually have a height of from about 1 to about 50 microns. In one embodiment, the repositionable forms may individually have a height from about 1 to 25 microns, and in another embodiment the non-adhesive forms may individually have a height from about 1 to about 15 microns. However, the height of the non-adhesive forms may vary depending on the method by which the microparticles applied.

The coverage of microparticles may be selected to provide a desired level of slidability or repositionability. The coverage of microparticles may also be selected based on the composition of the adhesive. For example, greater coverage of microparticles may be needed with extremely aggressive adhesives to provide a suitable level of slidability or repositionability. In one embodiment, the repositionable forms may cover from about 1 to about 75% of the total surface area of the release surface of the release liner. In one embodiment, the repositionable forms may cover from about 1 to about 50%, in another embodiment from about 1 to about 35%, in another embodiment from about 1 to about 20%, and in another embodiment from about 1 to about 10% of the total surface area of the release surface of the release liner. The microparticles may also cover from about 1 to about 75%, in one embodiment from about 1 to about 50%, in one embodiment from about 1 to about 35%, in one embodiment from about 1 to about 20%, and in one embodiment from about 1 to about 10% of the total surface area of the surface of the adhesive layer. The microparticles or surface contact elements may provide the graphics products with repositionability and/or slidability characteristics by reducing the initial tack of the adhesive to the substrate. Without being bound to any particular theory, the microparticles may reduce the initial tack of the adhesive to the substrate by reducing the surface area of the adhesive that is available to initially contact a substrate's surface. The microparticles may reduce the initial tack such that (i) the graphics products may be initially applied adhered to a substrate surface and removed therefrom without a substantial loss of adhesive properties and/or without damaging the substrate surface, and/or (ii) the graphics products may be placed against a substrate without pre-adhering to the substrate such that the article may be slid over the substrate's surface into a selected position.

Methods

The graphics products can be generated using any process suitable for such purpose. In one embodiment, the film compositions are deposited onto one or more removable support(s) or carrier layer(s) by techniques known to those skilled in the art. Examples of such techniques include die coating, knife coating, curtain coating and reverse roll coating. The removable support can be separated after the compositions have been dried or solidified. An exemplary removable support can be selected from a group including a siliconized belt, a release paper, and a release film such as PET or other suitable materials.

In a particular embodiment, a graphics product is produced by casting a polyvinyl chloride film on a polyurethane layer which serves as the substrate. After deposition of the polyvinyl chloride film on the polyurethane layer, an effective amount of adhesive is applied to the resulting face of the polyvinyl chloride film. If a barrier layer is utilized, the barrier layer is applied to the face of the polyvinyl chloride film prior to application of the adhesive layer. The amounts of the materials for each layer are selected to produce the layer thicknesses noted herein.

Specifically, in a method according to the present subject matter, a graphics product including a film layer having polyvinyl chloride, a layer of adhesive disposed on a first face of the film layer, and a layer of polyurethane disposed on and immediately adjacent to a second face of the film layer, is produced as follows. A layer of polyurethane is provided. The layer of polyurethane may be dispensed from a previously provided source, or may be formed and/or prepared just prior to the next operation. A polyvinyl chloride containing composition in liquid form is also provided. The polyvinyl chloride containing composition is then deposited onto the layer of polyurethane to form a film layer containing PVC on the layer of polyurethane. The method then involves solidifying the PVC film layer. And, the method additionally involves forming a layer of adhesive on the solidified PVC film layer, whereby a graphics product is produced.

In certain versions of this method, prior to forming the layer of adhesive on the solidified PVC film layer, the method further comprises depositing a barrier layer on the solidified PVC film layer. And, the operation of forming the layer of adhesive on the solidified PVC film layer is performed by forming the layer of adhesive on the barrier layer.

In particular versions of the methods, the adhesive layer includes a pressure sensitive adhesive. Typically, the polyvinyl chloride containing composition is deposited directly upon the layer of polyurethane. As previously noted herein, the polyvinyl chloride composition typically includes from 10% to 35% of pigment. In certain embodiments, the polyvinyl chloride composition includes 10% to 20% of copolymer. And, in certain embodiments, the polyvinyl chloride composition includes 50% to 75% of polyvinyl chloride.

As noted, the resulting graphics product may exhibit a peak tensile load of at least 11.0 lbf/inch. The graphics product may exhibit an elongation greater than 170%. The graphics product may exhibit a modulus within a range of from 52,000 psi to 63,000 psi. In particular embodiments, the graphics products exhibit two of these characteristics. And in other embodiments, the graphics products exhibit all of these characteristics.

And, in certain versions, the adhesive layer in the graphics products includes a non-permanent acrylic adhesive. And, in particular embodiments, the polyurethane is an aliphatic polycaprolactone thermoplastic polyurethane.

EXAMPLES

In order to further evaluate various graphics products of the present subject matter, various samples were prepared and subjected to testing as follows.

The tensile elongation and tensile strength of the film were evaluated using a MTS Sintech 500/S tensile tester. A modified ASTM D882 procedure was used to determine the tensile strength and percentage elongation of the graphics products of the present subject matter. The procedure is as follows:

A 1 inch wide by 4 inch long (25.4 mm×101.6 mm) specimen was cut from the graphics product sample with the 4 inch length being parallel to the machine direction of the film.

The specimen was gripped across the 1 inch width at both ends, so that the separation between the grips was 2 inches (50.8 mm).

The crosshead speed was set at 12 inches per minute ("ipm") (304.8 mm per minute).

The tensile strength was obtained, which is the product of (tensile stress)×(thickness of the film). The tensile strength at break is the product of (maximum stress that occurs at break)×(thickness of the film).

The percent elongation is reported by the machine.

The modulus is also reported by the machine.

Additional parameters are noted in the tables herein.

Gloss Retention

Gloss can be measured using a BYK Gardner Micro-TRI-Gloss Gloss Meter from BYK Gardner USA in Columbia, Md. The universal measurement angle of 60° is used for the measurement. Typically, the acceptable gloss reading is 80 or higher.

Color

CIE L*a*b* Color Space is used to describe the color of a sample. This 3-dimensional color space system was developed by the International Commission on Illumination (CIE), and defines L* as representing the lightness of the color, ranging from 0 (black) to 100 (white). In this system, a* represents the color's position along the red (magenta)/green axis, in which negative values represent green and positive values represent red or magenta, and b* represents the color's position along the blue/yellow axis, in which negative values represent blue and positive values represent yellow. The test can be conducted using a COLOR I 5 Benchtop Spectrophotometer available from X-Rite, Inc., Grand Rapids, Mich. The test method is TAPPI T524 om-94.

Resistance to Weathering

Accelerated weathering test simulates the damaging effects of long term outdoor exposure of materials by exposing test samples to light, moisture and temperature extremes. A sample is tested and observed for light fastness (fading of colors), and weatherability (cracking, chalking, curling, shrinkage, etc.). An Atlas Ci65A Xenon Arc Weather-Ometer and Ci5000 Chamber from Atlas Material Testing Technology LLC in Chicago, Ill. can be used for this test. Xenon testing is performed in accordance with ISO 4892-2 Xenon Testing.

A printing pattern with white, yellow, magenta, cyan and black stripes is first printed on a printable substrate. The graphics product of the current subject matter, which may be transparent, translucent, clear or have other desirable optical properties, is then laminated over the print layer to make a film laminate through the use of a pressure sensitive adhesive. The sample is first tested for CIE L*a*b* Color Space before being placed in the Weather-Ometer. The sample is allowed to age in the Weather-Ometer for a designated amount of time. The sample is taken out of the Weather-Ometer for CIE L*a*b* Color Space reading and observed for any changes in shrinkage, chalking, cracking, etc. Visible change and changes to L*, a*, b* as represented by delta E are recorded in regular intervals during sample aging. The durability is represented by the exposure time before color change becomes visible or delta E reaches a significant level, such as a value of 10. ΔE value is calculated using the following formula: $\Delta E = \sqrt{(\Delta L^2 + \Delta a^2 + \Delta b^2)}$.

Figure 2:
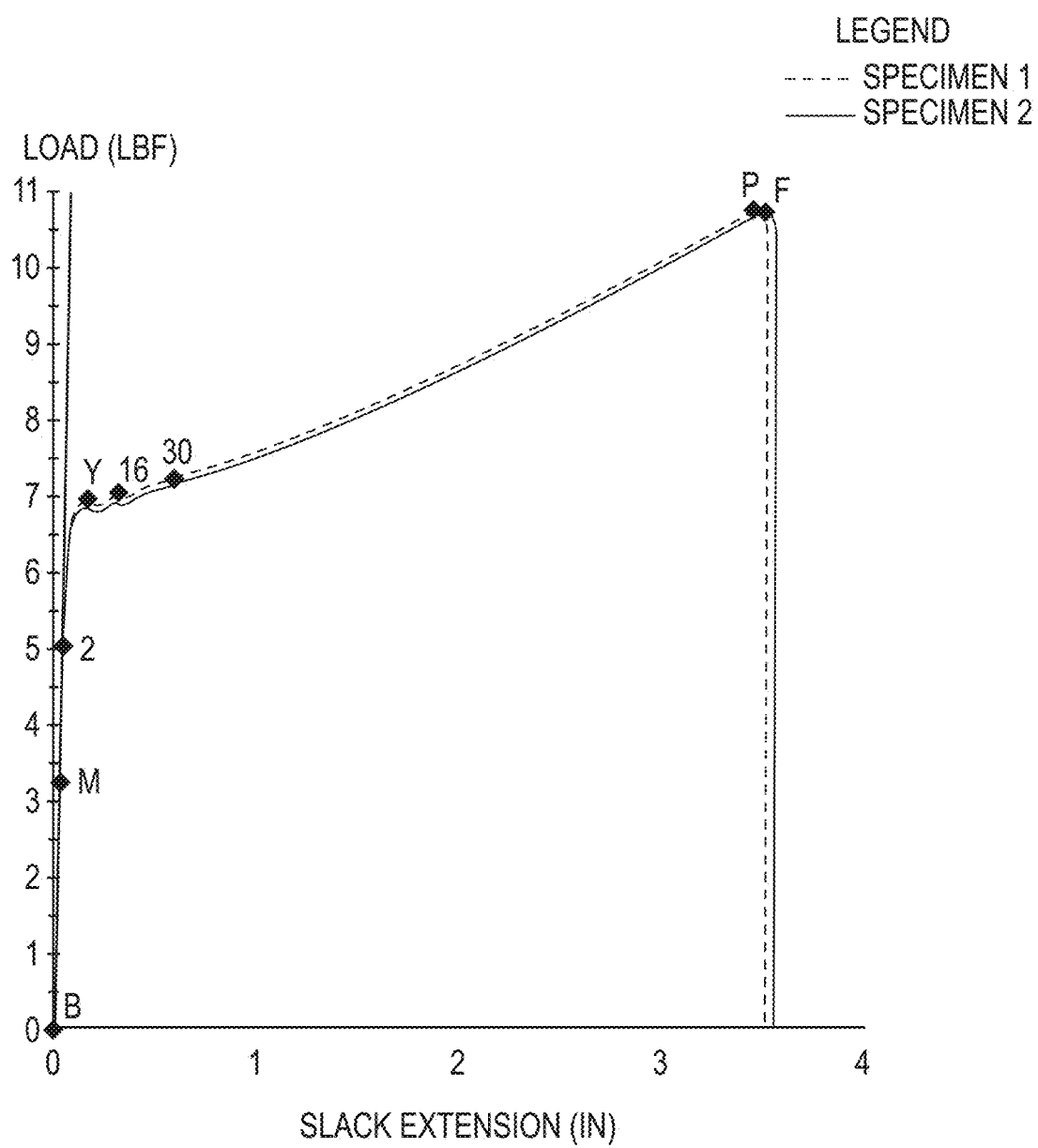
FIGS. 2 and 3 are graphs of load versus slack extension of samples evaluated and described herein.

In one set of evaluations, graphics products exhibiting a silver color (referred to herein as "silver samples") were subjected to various testing and evaluations. Two samples, designated as Specimens 1 and 2, were subjected to tensile testing. The results of such tensile testing are summarized in Tables 1-4. FIG. 2 illustrates load as a function of slack extension for these specimens.

TABLE 1

Tensile Testing Summary for Silver Samples

| Specimen # | Width Inch | Thickness Mil. | Peak Load lbf | T = UTS psi | % Elongation @ Break % | TEA in*lbf/in^2 | Yield Stress psi |
|---|---|---|---|---|---|---|---|
| 1 | 1.000 | 4.5000 | 10.9 | 2413 | 177.5 | 15.054 | 1519.9 |
| 2 | 1.000 | 4.5000 | 10.8 | 2406 | 174.4 | 14.870 | 1557.2 |
| Mean | 1.000 | 4.5000 | 10.8 | 2410 | 176.0 | 14.962 | 1538.6 |
| Std. Dev. | 0.000 | 0.0000 | 0.0 | 5 | 2.2 | 0.131 | 26.4 |

TABLE 2

Tensile Testing Summary for Silver Samples

| Specimen # | % Strain @ Yield % | Off Yield Load lbf | Off Yield Strss psi | Modulus psi | SecMod @ % Strn2 psi | Load @% Strain lbf | Load 16% Strain lbf |
|---|---|---|---|---|---|---|---|
| 1 | 6.5 | 6.69 | 1486.3 | 59549.97 | 53340.8 | 4.801 | 6.905 |
| 2 | 8.4 | 6.82 | 1514.6 | 52086.96 | 48198.8 | 4.338 | 7.052 |
| Mean | 7.5 | 6.75 | 1500.4 | 55818.47 | 50769.8 | 4.569 | 6.979 |
| Std. Dev. | 1.3 | 0.09 | 20.0 | 5277.14 | 3636.0 | 0.327 | 0.104 |

TABLE 3

Tensile Testing Summary for Silver Samples

| Specimen # | Load 30% Strain lbf | Break Load lbf | Gage Length Adjustment inch |
|---|---|---|---|
| 1 | 7.146 | 10.38 | 2.000 |
| 2 | 7.269 | 10.80 | 2.000 |
| Mean | 7.208 | 10.59 | 2.000 |
| Std. Dev. | 0.087 | 0.29 | 0.000 |

TABLE 4

Parameters of Tensile Testing for Silver Samples

| Name | Value | Units |
|---|---|---|
| Break Threshold | 1.000 | lbf |
| Crosshead Speed | 12.00 | in./min. |
| Data Acq. Rate | 10.0 | Hz |
| Load Cell Limit | 100 | lbf |
| Max. Specimens | 999 | |
| Outer Loop Rate | 100 | Hz |
| Secondary CH SP | 12.00 | in./min. |

Figure 3:
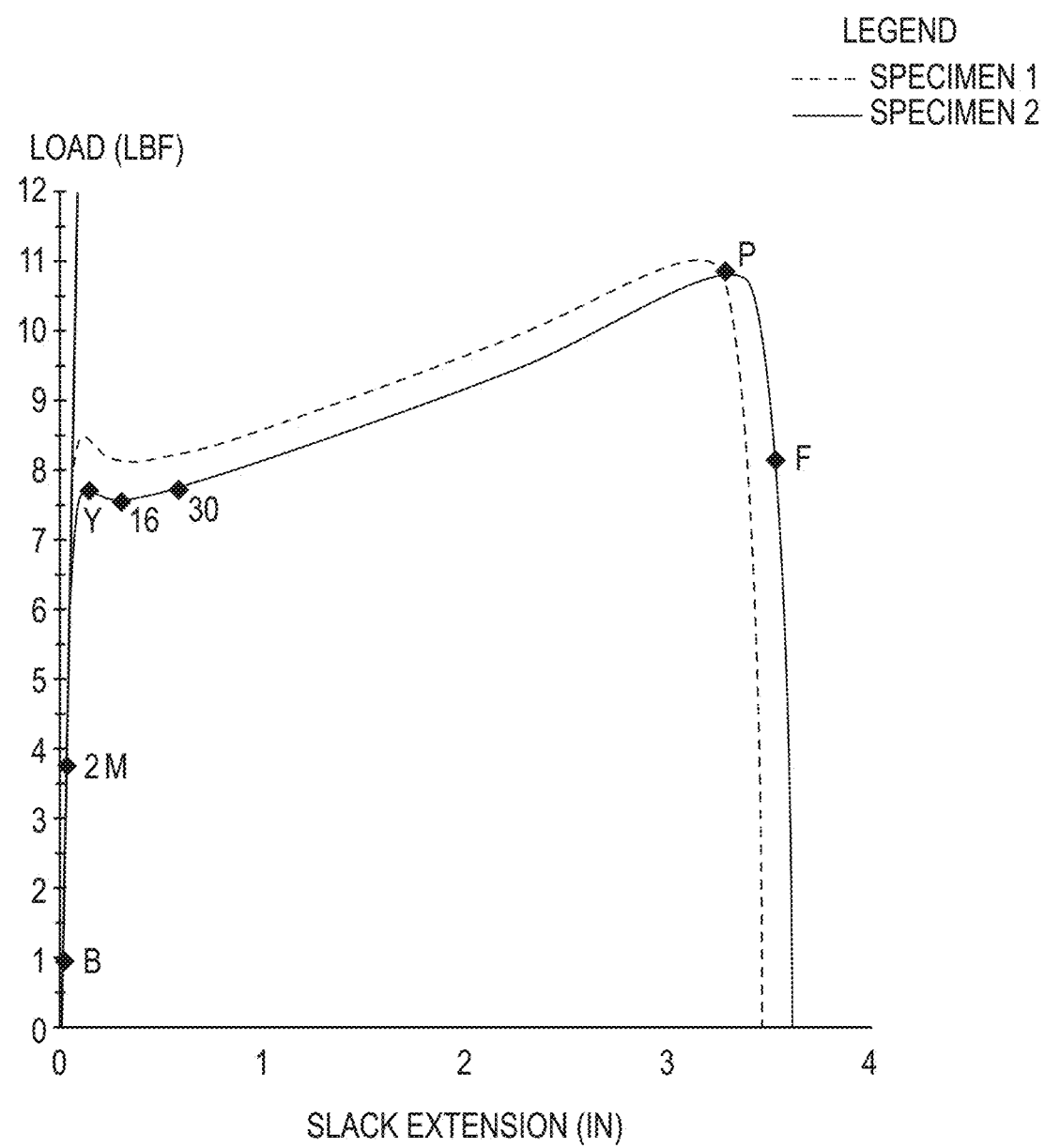

In another set of evaluations, graphics products exhibiting a blue color (referred to herein as "blue samples") were subjected to various testing and evaluations. Two samples, designated as Specimens 1 and 2, were subjected to tensile testing. The results of such tensile testing are presented in Tables 5-8. FIG. 3 illustrates load as a function of slack extension for these specimens.

TABLE 5

Tensile Testing Summary for Blue Samples

| Specimen # | Width Inch | Thickness Mil. | Peak Load lbf | T = UTS psi | % Elongation @ Break % | TEA in*lbf/in^2 | Yield Stress psi |
|---|---|---|---|---|---|---|---|
| 1 | 1.000 | 4.5000 | 11.0 | 2445 | 170.8 | 15.775 | 1871.3 |
| 2 | 1.000 | 4.5000 | 10.9 | 2415 | 175.3 | 15.683 | 1700.2 |
| Mean | 1.000 | 4.5000 | 10.9 | 2430 | 173.1 | 15.729 | 1785.7 |
| Std. Dev. | 0.000 | 0.0000 | 0.1 | 21 | 3.2 | 0.065 | 121.0 |

TABLE 6

Tensile Testing Summary for Blue Samples

| Specimen # | % Strain @ Yield % | Off Yield Load lbf | Off Yield Strss psi | Modulus psi | SecMod @ % Strn2 psi | Load @% Strain lbf | Load 16% Strain lbf |
|---|---|---|---|---|---|---|---|
| 1 | 6.8 | 8.42 | 1871.0 | 62821.09 | 60486.0 | 5.444 | 8.085 |
| 2 | 7.3 | 7.56 | 1680.2 | 61630.93 | 55300.1 | 4.977 | 7.562 |
| Mean | 7.1 | 7.99 | 1775.6 | 62226.01 | 57893.0 | 5.210 | 7.823 |
| Std. Dev. | 0.4 | 0.61 | 134.9 | 841.57 | 3667.0 | 0.330 | 0.370 |

TABLE 7

Tensile Testing Summary for Blue Samples

| Specimen # | Load 30% Strain lbf | Break Load lbf | Gage Length Adjustment inch |
|---|---|---|---|
| 1 | 8.177 | 5.56 | 2.000 |
| 2 | 7.734 | 8.13 | 2.000 |
| Mean | 7.956 | 6.85 | 2.000 |
| Std. Dev. | 0.313 | 1.82 | 0.000 |

TABLE 8

Parameters of Tensile Testing for Blue Samples

| Name | Value | Units |
|---|---|---|
| Break Threshold | 1.000 | lbf |
| Crosshead Speed | 12.00 | in./min. |
| Data Acq. Rate | 10.0 | Hz |
| Load Cell Limit | 100 | lbf |
| Max. Specimens | 999 | |
| Outer Loop Rate | 100 | Hz |
| Secondary CH SP | 12.00 | in./min. |

Figure 4:
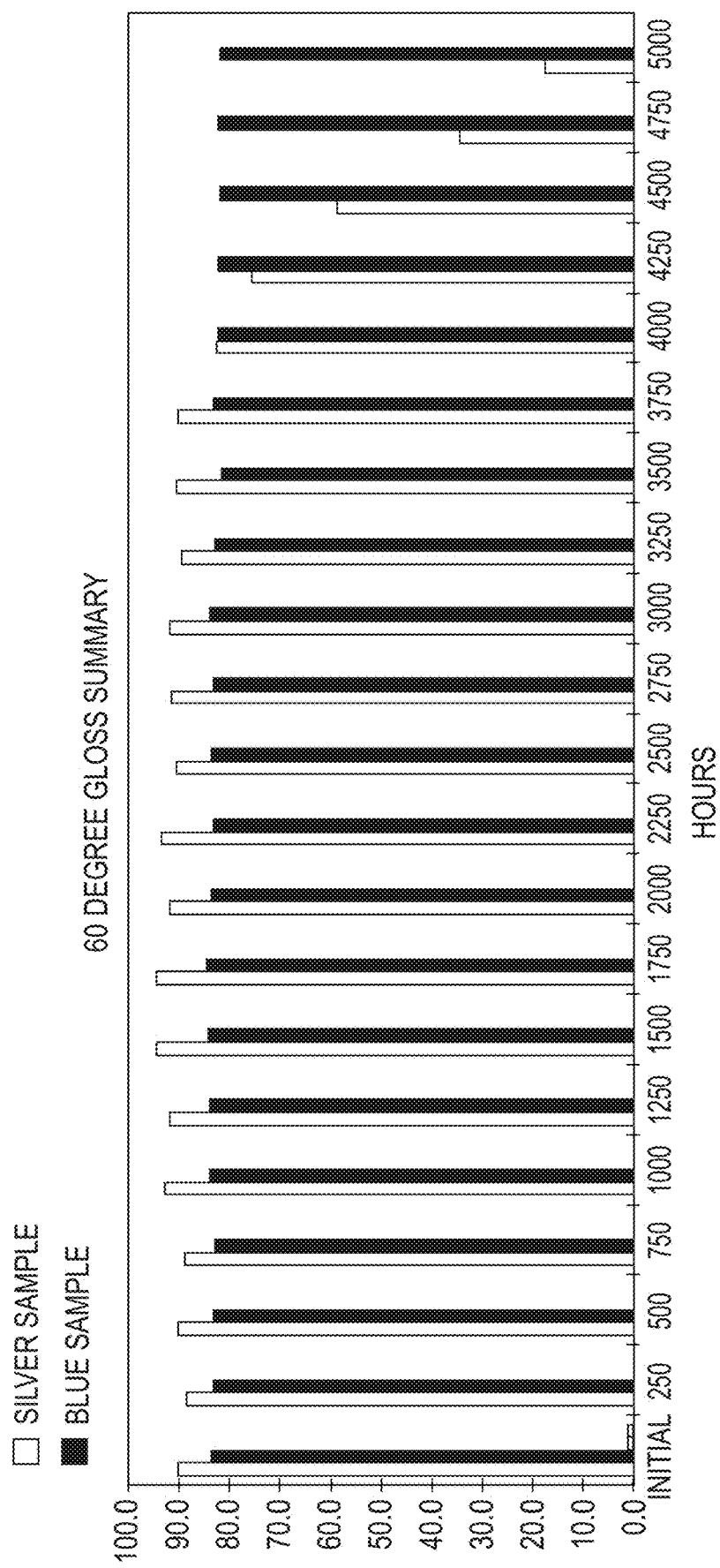
FIG. 4 is a chart of gloss retention of samples evaluated and described herein.
Figure 5:
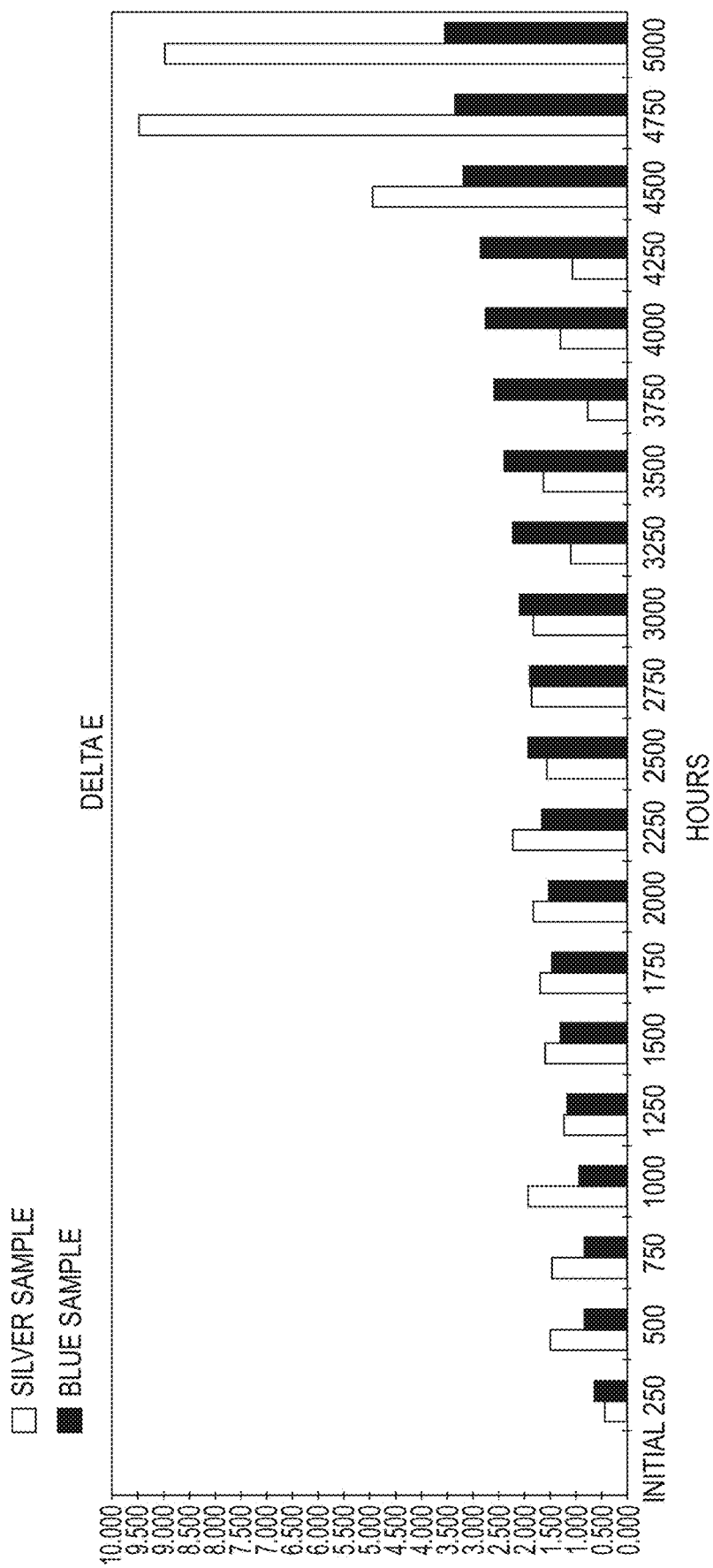
FIG. 5 is a chart of color change of samples evaluated and described herein.

In yet another set of evaluations, the previously noted silver samples and blue samples were subjected to gloss retention evaluation. In this evaluation, the noted samples were exposed to a Xenon light source for extended periods of time, i.e., up to 5,000 hours, and 60 degree gloss values and ΔE measurements, i.e., color change, were obtained. FIG. 4 summarizes 60 degree gloss measurements of the silver samples and the blue samples. FIG. 5 summarizes ΔE measurements obtained for the silver samples and the blue samples for each of the noted time periods.

Figure 6:
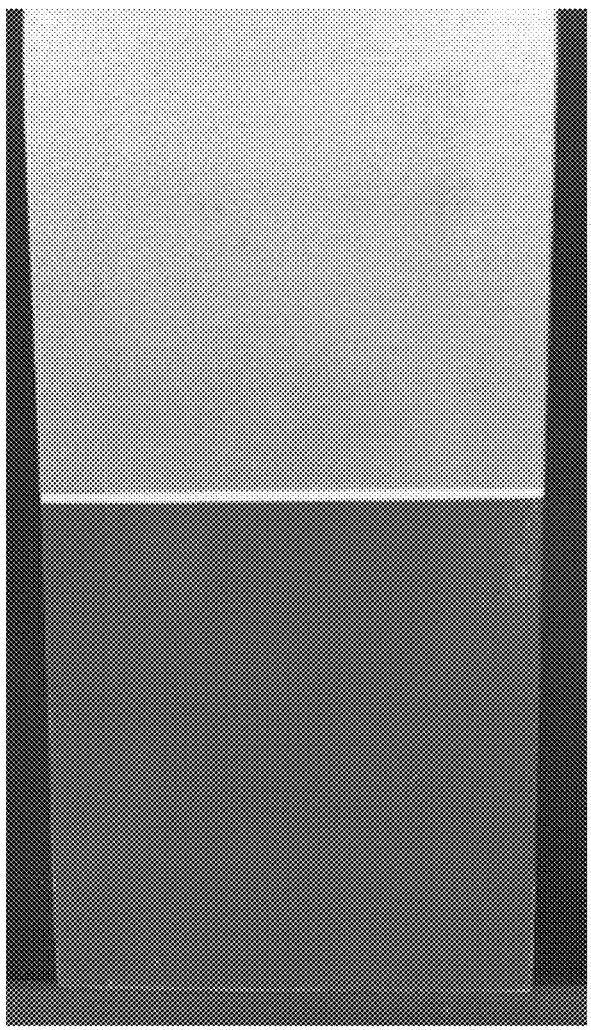
FIGS. 6 and 7 are photographs comparing samples after exposure to weathering factors as described herein.

FIG. 6 is a photograph of a silver sample (top) and a blue sample (bottom) after 4,750 hours exposure to the Xenon light source. The silver sample exhibited the first instance of discoloration or degradation at this time period of 4,750 hours. The corresponding ΔE, i.e., color change, for the silver sample at this time was ΔE=9.5.

Figure 7:
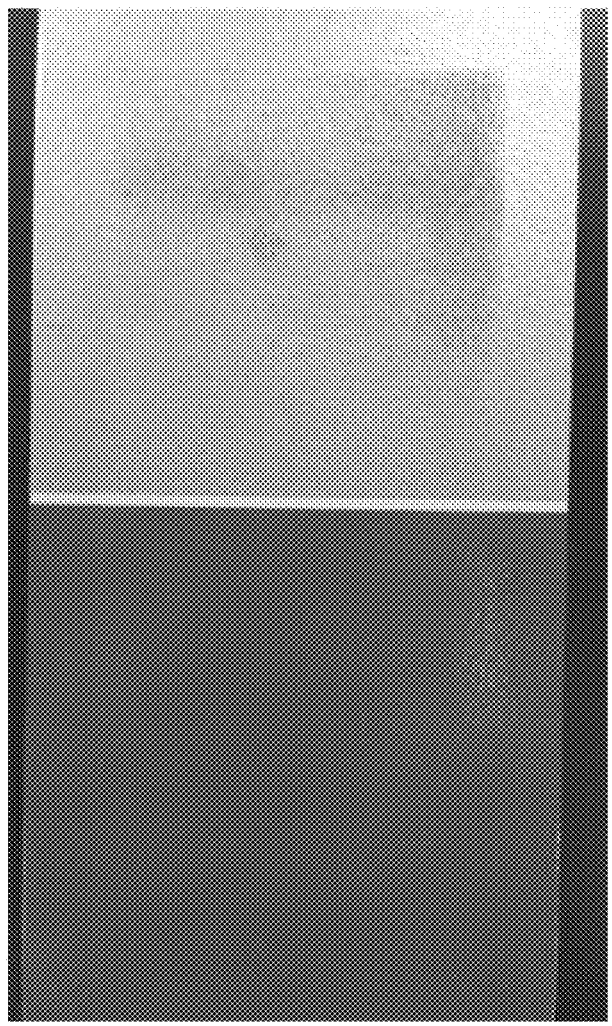

FIG. 7 is a photograph of a silver sample (top) and a blue sample (bottom) after 5,000 hours exposure to the Xenon light source. The silver sample exhibited a browning or cracking appearance with a ΔE=9.0.

These evaluations and testing results demonstrate that graphics products according to the present subject matter exhibit a combination of excellent properties. Many of the samples of graphics products also exhibited excellent conformability, removability, and/or ability to be repositioned.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A graphics product comprising:
   a film layer, the film defining a first face and a second face oppositely directed from the first face;
   a layer of adhesive disposed on the first face of the film layer;
   a layer of flexible transparent polyurethane disposed on and immediately adjacent to the second face of the film layer;
   a barrier layer disposed between the film layer and the layer of adhesive;
   wherein the flexible transparent polyurethane serves as substrate and the film layer is casted on the flexible transparent polyurethane;
   wherein the polyurethane is an aliphatic polycaprolactone thermoplastic polyurethane;
   wherein the film layer comprises (i) pigment or pigment dispersion, (ii) copolymer or copolymer dispersion, and (iii) polyvinyl chloride (PVC) or a PVC dispersion;
   wherein each of the film layer, the layer of adhesive, the layer of flexible transparent polyurethane, and the barrier layer has thickness from 0.5 mils to 1.5 mils;
   wherein the graphics product exhibits a peak tensile load of at least 11.0 lbf/inch;
   wherein the graphics product exhibits an elongation greater than 170%;
   wherein the graphics product exhibits a modulus within a range of from 52,000 psi to 63,000 psi; and
   wherein the graphics product is free of adhesive between the layer of flexible transparent polyurethane and the second face of the film layer.

2. The graphics product of claim 1 wherein the adhesive disposed on the first face of the film layer is a pressure sensitive adhesive.

3. The graphics product of claim 1 wherein the film layer comprises from 10 wt % to 35 wt % of the pigment.

4. The graphics product of claim 1 wherein the film layer comprises 10 wt % to 20 wt % of the copolymer.

5. The graphics product of claim 1 wherein the film layer comprises 50 wt % to 75 wt % of the polyvinyl chloride.

6. The graphics product of claim 1 wherein the barrier layer comprises at least one agent to impart opacity to the barrier layer.

7. The graphics product of claim 1 wherein the film layer is transparent.

8. The graphics product of claim 1 wherein the adhesive is a repositionable pressure sensitive adhesive.

9. The graphics product of claim 1 wherein the adhesive is a non-permanent acrylic adhesive.

10. The graphics product of claim 1 wherein the layer of flexible transparent polyurethane is free of polyvinyl chloride.

11. The graphics product of claim 1 wherein the layer of adhesive defines an air egress pattern.

12. The graphics product of claim 1 wherein the adhesive layer includes at least one of (i) microparticles at least partially projecting outward from a face of the adhesive layer, and (ii) repositionable forms projecting outward from a face of the adhesive layer.

* * * * *